United States Patent
Dugue et al.

(10) Patent No.: US 11,249,868 B2
(45) Date of Patent: *Feb. 15, 2022

(54) METHOD OF FAULT MANAGEMENT IN A NETWORK OF NODES AND ASSOCIATED PART OF NETWORK OF NODES

(71) Applicant: BULL SAS, Les Clayes-sous-Bois (FR)

(72) Inventors: Sébastien Dugue, Saint Theoffrey (FR); Christophe Laferriere, Grenoble (FR); Benoit Welterlen, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/958,202

(22) PCT Filed: Dec. 21, 2018

(86) PCT No.: PCT/FR2018/053535
§ 371 (c)(1),
(2) Date: Jun. 26, 2020

(87) PCT Pub. No.: WO2019/129986
PCT Pub. Date: Jul. 4, 2019

(65) Prior Publication Data
US 2021/0073091 A1   Mar. 11, 2021

(30) Foreign Application Priority Data
Dec. 27, 2017  (FR) ..................... 1763237

(51) Int. Cl.
*G06F 11/20* (2006.01)
*G06F 11/14* (2006.01)
*G06F 13/40* (2006.01)

(52) U.S. Cl.
CPC ...... *G06F 11/2025* (2013.01); *G06F 11/1438* (2013.01); *G06F 11/1464* (2013.01);
(Continued)

(58) Field of Classification Search
CPC ............. G06F 11/1438; G06F 11/1464; G06F 11/2025; G06F 11/2033; G06F 13/4022; G06F 2213/0026
See application file for complete search history.

(56) References Cited

U.S. PATENT DOCUMENTS 4,709,325 A    11/1987  Yajima
5,696,895 A *  12/1997  Hemphill ............. G06F 11/142
                                                           714/13
(Continued)

FOREIGN PATENT DOCUMENTS

EP      0 136 560 A2    4/1985
WO      2009/140979 A1  11/2009

OTHER PUBLICATIONS

R. Niati, N. Yazdani and M. Nourani, "Deployment of spare nodes in wireless sensor networks," 2006 IFIP International Conference on Wireless and Optical Communications Networks, 2006, pp. 5 pp. -5, doi: 10.1109/WOCN.2006.1666544.*

(Continued)

*Primary Examiner* — Matthew M Kim
*Assistant Examiner* — Kurosu Risa Altaf
(74) *Attorney, Agent, or Firm* — Meagher Emanuel Laks Goldberg & Liao, LLP.

(57) ABSTRACT

The invention relates to a method of fault management in a network of nodes (2), comprising, for each node considered (2) of all or part of the nodes (2) of the network performing one and the same calculation: firstly, a step of local backup of the state of this node considered (21), at the level of a storage medium (31) for this node considered (21), the link (6) between this storage medium (31) and this node considered (21) being able to be redirected from this storage medium (31) to another node (23), thereafter, a step of relaunching: either of the node considered (21) if the latter is not defective, on the basis of the local backup of the state (Continued)

of this node considered (21), or of an operational node (23) different from the node considered (21), if the node considered (21) is defective, on the basis of the recovery of the local backup of the state of this node considered (21), by redirecting said link (6) between the node considered (21) and its storage medium (31) so as to connect said storage medium (31) to said operational node (23), the local backups of these nodes considered (2), used for the relaunching steps, are mutually consistent so as to correspond to one and the same state of this calculation.

20 Claims, 1 Drawing Sheet

(52) U.S. Cl.
CPC ...... *G06F 11/2033* (2013.01); *G06F 13/4022* (2013.01); *G06F 2213/0026* (2013.01)

(56) References Cited

U.S. PATENT DOCUMENTS

| | | | | |
|---|---|---|---|---|
| 9,619,389 | B1* | 4/2017 | Roug | G06F 3/067 |
| 2008/0091746 | A1* | 4/2008 | Hatasaki | G06F 11/2033 |
| 2009/0006238 | A1* | 1/2009 | Callaway | G06F 11/1641 |
| | | | | 705/35 |
| 2011/0134749 | A1 | 6/2011 | Speks et al. | |
| 2012/0185727 | A1* | 7/2012 | Yoon | G06F 11/1438 |
| | | | | 714/15 |
| 2014/0119171 | A1 | 5/2014 | Speks et al. | |
| 2014/0215264 | A1* | 7/2014 | Ono | G06F 11/0757 |
| | | | | 714/13 |
| 2014/0281688 | A1 | 9/2014 | Tiwari et al. | |
| 2015/0242290 | A1* | 8/2015 | Sue | G06F 3/067 |
| | | | | 714/4.11 |
| 2015/0269045 | A1* | 9/2015 | Riedle | G06F 11/2033 |
| | | | | 714/6.3 |
| 2015/0355983 | A1 | 12/2015 | Harper et al. | |
| 2016/0314050 | A1* | 10/2016 | Cho | G06F 11/2023 |

OTHER PUBLICATIONS

J.—. Hwang, M. Balazinska, A. Rasin, U. Cetintemel, M. Stonebrakerand S. Zdonik, "High-availability algorithms for distributed stream processing," 21st International Conference on Data Engineering (ICDE'05), 2005, pp. 779-790, doi: 10.1109/ICDE. 2005.72. (Year: 2005).*
International Search Report of the International Searching Authority for PCT/FR2018/053535 dated Apr. 3, 2019.
English translation of International Search Report of the International Searching Authority for PCT/FR2018/053535 dated Apr. 3, 2019.

* cited by examiner

METHOD OF FAULT MANAGEMENT IN A NETWORK OF NODES AND ASSOCIATED PART OF NETWORK OF NODES

FIELD OF THE INVENTION

The invention relates to the field of fault management in a network of nodes and the field of the parts of network nodes associated with this fault management.

CONTEXT OF THE INVENTION

In a network of nodes performing one and the same calculation, backups are performed at one or at several levels; these are multilevel backups. When a fault occurs, the calculation can be at least recovered in part without having to be entirely restarted, precisely because of the backups performed. Depending on the type of fault that has occurred, one or the other of the backup levels is used to recover the calculation partially, or even predominantly, or even virtually entirely.

Distributed applications may last much longer than the mean length of time without a fault in a network, also referred to as Mean Time Between Failures (MTBF); they therefore have many opportunities to be interrupted. They generally do not have an internal fault management solution, so this may firstly lead to the loss of local backup data in the event of a physical fault of the calculation node, followed next by the loss of the entire calculation progress caused by the loss of a single calculation node but for which the local backup data cannot be recovered.

There are solutions for backup and restarting (checkpoint/restart) from backups, enabling applications to back up their context regularly at different backup levels, that are more or less quick.

The different backup levels range from the most local backup to the most global backup, thus ranging from the simplest and quickest backup to the most complex, slowest and most expensive backup, thus also ranging from the most fragile and weakest backup to the most robust and most resilient backup.

According to prior art corresponding to the FTI (fault tolerance interface) library, four backup levels are known, which are:

The first level L1 which performs a local, simple and inexpensive backup, performed highly regularly, meaning a minimal loss of calculation time during a fault that can be recovered at this sole first level L1, The second level L2 which performs a first intermediate backup by duplication on a partner node, which is less simple and more expensive, meaning a more significant loss of calculation time during a fault which can only be recovered at this second level L2, The third level L3, which performs a second intermediate backup by encoding of Reed-Solomon type, which is even less simple and even more expensive, meaning an even more significant loss of calculation time during a fault which can only be recovered at this third level L3, The fourth level L4, which performs a global backup at a file system level, which is complex and highly expensive, meaning a truly great loss of calculation time during a fault which can only be recovered at this fourth level L4.

From the local level L1 to the global level L4, the backup is increasingly robust and resilient, but it also becomes increasingly complex and expensive. This is why the backup of the first level L1 is carried out often, the backup of the second level L2 less often, the backup of the third level L3 even less often, the backup of the fourth level L4 relatively rarely. Consequently, statistically, when a fault occurs, the last coherent state that can be recovered is, very recent at the first level L1, less recent at the second level L2, even less recent at the third level L3, and older at the fourth level L4. Consequently, the volume of work lost is very low at the first level L1, relatively limited at the second level L2, appreciable at the third level L3, and greater old at the fourth level L4.

SUMMARY OF THE INVENTION

The aim of the present invention is to provide a method of fault management in a network of nodes that at least partially solves the above-mentioned disadvantages.

More particularly, the invention aims to provide a method of fault management in a network of nodes that improves the compromise between efficiency on the one hand and cost and complexity on the other, for at least one backup level considered.

The invention more particularly aims to provide a method of fault management in a network of nodes that has similar or comparable efficiency to that of a backup at the intermediate level, preferentially that of the first intermediate backup, advantageously that of the second level L2, for similar or comparable cost and complexity as those of a backup at the local level, advantageously those of the first level L1.

For this purpose, the invention proposes making the link between a storage medium and its node redirectable to another node, so as to be able to have the backup carried out on the storage medium when the node is defective, optionally via a copy at a neighboring node, but without having produced a backup copy at a neighboring node for the majority of the nodes which are not defective or for all the nodes which are not defective. The link between a storage medium and its node is not carried out directly, but indirectly, through a network element able to reconfigure this link to connect this storage medium to another node when the previous node becomes defective. This network element connects several nodes to their respective storage media, each node being connected to its associated storage medium (or optionally to its associated storage media).

In summary, for a defective node, a backup is available despite the failure of this node, meaning a similar efficiency to the second level L2, but no operation more complex than a simple local backup is carried out for the majority of, or for all of, the nodes which are not defective, which is the majority or even the vast majority of the nodes of the network performing the calculation in question, meaning a cost and a complexity that are at least comparable, if not similar, to those of the first level L1.

Thus, according to embodiments of the invention, a saving is made in the cost of the second level L2, while the ability to restart an application from backups of the first level L1 in the event of a fault of a calculation node is retained. The copying to a neighboring node that is conventionally performed at the second level L2 is not carried out here during the execution of the application in a preventative manner for all the calculation nodes, but only in the event of a fault and only for the nodes that are defective after the fault occurs. Copying is then only done to restart the application with the missing data remounted from the local backup.

On the one hand, this backup, of similar or comparable cost and complexity to those of a local backup, has the efficiency of an intermediate backup, which greatly improves the quality-price ratio of this backup.

On the other hand, since this backup, of similar or comparable cost and complexity to a local backup, has the efficiency of an intermediate backup, it preferentially makes it possible to replace both a conventional local backup and one or more conventional intermediate backups, by only additionally retaining the global backup as a last resort to manage the most serious faults, the majority of faults now being able to be managed by the local-intermediate backup proposed by the invention, said local-intermediate backup having the efficiency of an intermediate backup for virtually the same price as a local backup.

To this end, this invention proposes a method of fault management in a network of nodes, comprising, for each node considered of all or part of the nodes of the network performing one and the same calculation: firstly, a step of local backup of the state of this node considered, at the level of a storage medium for this node considered, the link between this storage medium and this node considered being able to be redirected from this storage medium to another node, thereafter, a step of relaunching: either of the node considered if the latter is not defective, on the basis of the local backup of the state of this node considered, or of an operational node different from the node considered, if the node considered is defective, on the basis of the recovery of the local backup of the state of this node considered, by redirecting said link between the node considered and its storage medium so as to connect said storage medium to said operational node, the local backups of these nodes considered, used for the relaunching steps, are mutually consistent so as to correspond to one and the same state of this calculation.

To this end, this invention also proposes a part of a network of nodes, comprising: a switch, a plurality of nodes of a group of nodes performing one and the same calculation in this network of nodes, several storage media respectively connected to these nodes via the switch, these storage media being structured and arranged to locally backup the state of the nodes to which they are respectively connected, this switch being structured and arranged to change at least one connection between a defective node and its storage medium, which will then become connected to another node of said plurality of nodes.

According to embodiments of the invention, this method of fault management enables the optimization and resilience of the backup of data of an application liable to encounter a fault and the restarting of this application using backed-up data.

According to embodiments of the invention, this method of fault management offers the possibility of migrating a storage medium from the faulty calculation node by virtue of the switch, thereby making it possible to directly utilize the local backed-up data from a faulty calculation node in an amount of time which only depends to a small degree on the amount of backed-up data.

According to embodiments of the invention, this method of fault management offers a tolerance to faults which extends in absolute terms to a large number of calculation nodes as long as, on each calculation node which becomes faulty, there is a calculation node connected to the same switch which will be able to resume the calculation of the calculation node which has become faulty. It is then possible to start from the last local backup, even if a large number of the calculation nodes becomes faulty, as long as each calculation node which has become faulty has a switch and a neighboring non-defective calculation node connected to the same switch.

According to preferred embodiments, the invention comprises one or more of the following features which may be used separately or in partial combination with one another or in full combination with one another, applied to one or the other of the aforementioned subjects of the invention.

Preferably, for each non-defective node considered: there is no step of recovery by another node of the local backup of the state of this non-defective node considered.

Thus, for all the non-defective nodes, i.e. for the vast majority of the nodes of the network performing one and the same calculation, no operation more complex than a simple local backup has been carried out.

Preferably, the operational node different from the defective node considered is a spare node.

Thus, the non-defective nodes, which already each have their own calculation task to perform, are not loaded in addition to performing this operation of recovery of a neighboring defective node. A potential overload of these non-defective nodes is thus avoided.

Preferably, said redirection of said link between the node considered and its storage medium so as to connect said storage medium to said operational node is carried out by a change of routing in a switch connecting several nodes to their storage media.

Thus, this redirection is performed by a simple operation carried out at a network element that is reliable and controlled.

Preferably, all the steps for relaunching nodes are synchronized with one another, so as to relaunch all said nodes in one and the same calculation state.

This thus ensures complete consistency of the remainder of the calculation, performed after the relaunch.

Preferably, in a first implementation, the step of recovery comprising a sub-step of migration, to the operational node or to the spare node, of the storage medium for the local backup of the state of the defective node, which connects this storage medium for the local backup of the state of the defective node to a predetermined location in the file tree of this operational node or of this spare node, this operational node or this spare node then reading, at this predetermined location, the link to the local backup of the state of the defective node, during the step of relaunching this operational node or this spare node, no copy of the local backup of the state of the defective node being carried out at another node.

Thus, the recovery is made even more simple, since even for a defective node there is no duplication of its local backup which is carried out. There was already no duplication carried out for the local backup of the non-defective nodes.

Preferably, the spare node and the defective node that it replaces both belong to the same compute blade.

Thus, the redirection of the link between medium and node is performed more simply and more quickly, due to the geographical proximity between the spare node and the defective node.

Preferably, in a second implementation, the recovery step comprises: firstly, a sub-step of migration, to an intermediate node, of the storage medium for the local backup of the state of the defective node, which connects this storage medium for the local backup of the state of the defective node to a predetermined location in the file tree of this intermediate node, next, a sub-step of copying the local backup of the state of the defective node from the storage medium connected to the intermediate node to the storage medium of the operational node or of the spare node, this operational node or this spare node then reading its storage medium during its relaunching step.

Thus, even though the recovery, for a defective node, carries out a duplication of its local backup, there is on the other hand no need to indicate to the operational node or to the spare node where to seek the link to the storage medium of the defective node to be recovered. However, of course, there is still no duplication carried out for the local backup of the non-defective nodes.

The copying sub-step is not necessary and can be avoided by remounting the storage medium at the correct location in the file tree of the spare node as in the first embodiment described above, or else by simply changing the configuration of the fault tolerance library. This remounting is instantaneous and thus makes it possible to avoid an additional copy which could take some time depending on the volume of data to be backed up.

Preferably, for all or part of the nodes of the network performing one and the same calculation: the spare node and the defective node that it replaces belong to different compute blades.

Thus, the redirection of the link between medium and node can be performed even in the event of a significant fault and even a relatively generalized fault across an entire compute blade.

Preferably, all these steps are carried out for all the nodes of the network performing one and the same calculation.

Thus, the benefit of the method of fault management proposed by the invention is generalized by being extended to all the nodes of the network performing one and the same calculation.

Preferably, the migration sub-step changes the connection of the storage medium for the local backup of the state of the defective node by passing via a switch to which the defective node and its storage medium for the local backup of the state of the defective node were connected, but without passing through the defective node itself.

Thus, the redirection can be performed even in the event of a total physical failure of the defective node.

Preferably, the change in connection is carried out by sending a command to the switch, this command passing through one of the nodes connected to the switch by a management port.

Thus, it is the management port which is affected on recovery of the storage media of the defective nodes connected to one and the same switch.

This switch is preferably a PCIe switch ("Peripheral Component Interconnect express").

Thus, this switch is particularly advantageous since it is particularly well-suited to enabling peripherals to communicate with one another without having to pass via a microprocessor, thus by being able to bypass a defective calculation node for example.

The use of this PCIe switch makes it possible to connect the storage medium, for example a storage disk, containing the local backups of the faulty calculation node to a spare calculation node. This operation is quick and does not require a systematic copy of the local backup data, and in particular not for non-defective calculation nodes.

Preferably, 3 to 10 nodes are connected to the same switch.

Thus, the switch can easily manage this small group of nodes for which a single spare node appears to be sufficient.

Preferably, the method of fault management also comprises, for all or part of the nodes of the network performing one and the same calculation: a step of global backup of all of these nodes, carried out less frequently than all the steps of local backup of these nodes.

Thus, with on the one hand the local-intermediate backup proposed by the invention for managing the vast majority of faults simply and efficiently, and on the other hand the more complex and more expensive global backup, reserved for a minority of serious faults, an excellent compromise is achieved between global complexity and global efficiency of the method of fault management proposed by the invention.

In the context of a fault-tolerant application, using several backup levels, like in this case a quick local backup and a more complex and more expensive remote global backup, the method of fault management proposed by the invention thus makes it possible to restart the application, following a physical fault on a node, even complete, in the majority of cases, by starting from all the local backups, which are more recent and less expensive, instead of having to start from remote backups which are commonly significantly older, with some more rare cases of faults sometimes requiring the use of the remote global backup. The possibility of recovering local data from the faulty calculation node makes it possible, in most cases, to restart the application from the most recent local backups.

Preferably, for all or part of the nodes of the network performing the same calculation: the network comprises between 1 and 5 spare nodes per 100 nodes performing one and the same calculation.

Thus, the over-sizing of the network is minimal, while the vast majority of ordinary faults will be managed highly efficiently.

Preferably, for all or part of the nodes of the network performing one and the same calculation: this method of fault management does not comprise any other type of local backup of the state of these nodes.

Thus, the simplicity and the low cost of this type of local-intermediate backup proposed by the invention is of a similar simplicity to that of a purely local backup, for a much greater efficiency.

Preferably, for all or part of the nodes of the network performing one and the same calculation: the storage media are flash memories.

Thus, the memories used are simple, quick and permanent.

Preferably, these flash memories are NVMe memories ("Non-Volatile Memory express").

Thus, the memories used are particularly well-suited for communicating with a PCIe ("Peripheral Component Interconnect express") switch.

Preferably, this switch being structured and arranged to change at least one connection between a defective node and its storage medium, upon a command external to the switch.

Thus, it is the switch which performs the redirection of the link between the storage medium and its defective node, as soon as an element external to the switch has flagged this node deficiency and has notified it.

Preferably, said plurality of nodes comprises between 3 and 10 nodes.

Thus, the switch can easily manage this small group of nodes for which a single spare node appears to be sufficient.

Preferably, this switch is a PCIe switch.

Thus, this switch is particularly advantageous since it is particularly well-suited to enabling peripherals to communicate with one another without having to pass via a microprocessor.

Preferably, the storage media are flash memories, preferably NVMe memories.

Thus, the memories used are particularly well-suited for communicating with a PCIe switch.

Preferentially, the network of calculation nodes comprises at least 1000 calculation nodes, advantageously at least 5000 calculation nodes, even more advantageously at least 10000 calculation nodes, making the method of fault management according to the invention even more beneficial, since the complete loss of an ongoing calculation becomes all the more critical as the network gets larger.

The principle of fault tolerance is increasingly important when an application is executed on a cluster which consists of a larger number of calculation nodes. The greater the number of processors, memories and other peripherals, the greater the probability of a fault occurring before the end of the execution. Applications with the aim of being executed on this type of platform will use fault tolerance libraries which enable them to backup (checkpoint) the data necessary for a restart in a state as close as possible to the state which existed just before the fault. Thus, these applications are not forced to restart the calculation from the beginning.

Other characteristics and benefits of the invention will become apparent upon reading the following description of a preferred embodiment of the invention, given as an example with reference to the attached drawings.

DETAILED DESCRIPTION OF THE INVENTION

Figure 1:
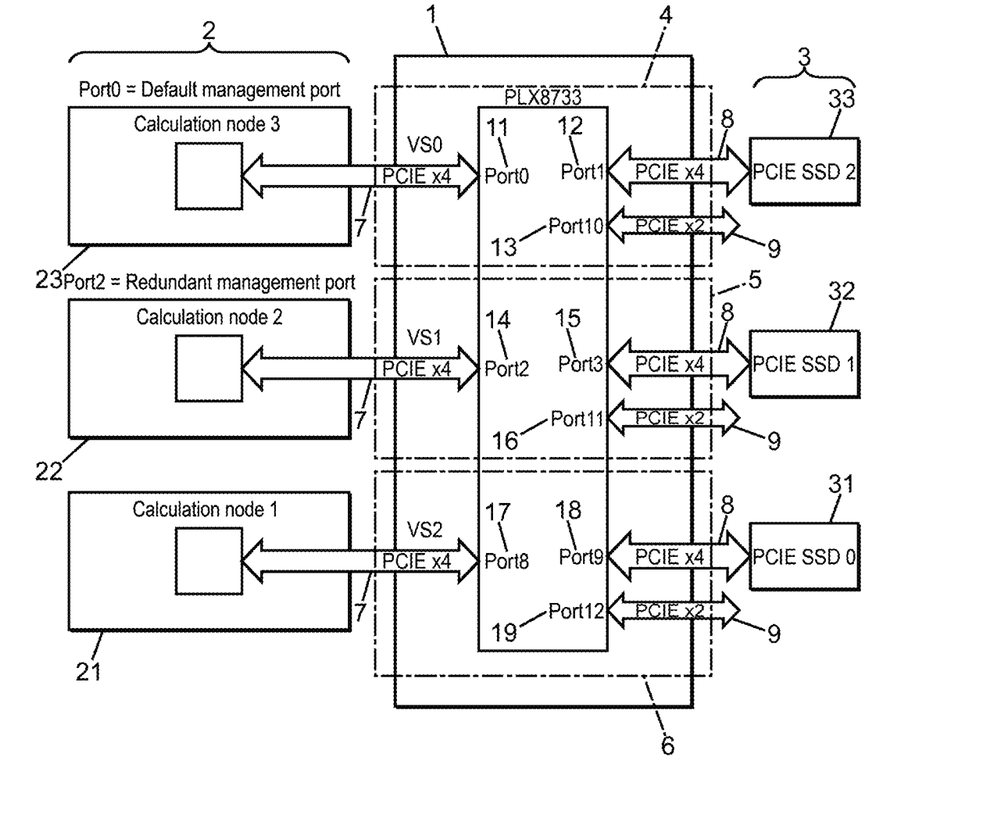
FIG. 1 schematically shows an example of a network part including a group of nodes and their storage media connected to one another by a PCIe switch, according to one embodiment of the invention, at which network part an example of a method of fault management according to the invention may occur.

FIG. 1 schematically shows an example of a network part including a group of nodes and their storage media connected to one another by a PCIe switch, according to one embodiment of the invention, at which network part an example of a method of fault management according to the invention may occur.

This network part comprises several calculation nodes 2, three calculation nodes 21, 22 and 23, in the example of FIG. 1, and also several storage media 3, three storage media 31, 32 and 33, in the example of FIG. 1.

These calculation nodes 2 and their storage media 3 form a group of calculation nodes managed by a PCIe switch 1 connecting these calculation nodes 2 to their respective storage media 3, via bidirectional PCIe connections 7, 8 or 9. These PCIe connections 7, 8 or 9, can be multichannel PCIe connections. Connection 7 is a 4-channel connection. Connection 8 is a 4-channel connection. Connection 9 is a 2-channel connection, here not yet used, each connection 9 being connected on one side to one of the ports 13, 16 or 19 and remaining free on the other side. Each PCIe connection 7 respectively connects one of the calculation nodes 21 to 23 to one of the ports 0, 2 or 8 (numbering of the PLX 8733 electronic switch, but another PCIe switch may be used), respectively referenced 11, 14 or 17 in FIG. 1, of the switch 1. Each PCIe connection 8 respectively connects one of the storage media 31 to 33 to one of the ports 1, 3 or 9, respectively referenced 12, 15 or 18 in FIG. 1, of the switch 1. Connection 7, ports 0 and 1, respectively referenced 11 and 12 in FIG. 1, of the switch 1, connection 8 together form a link 4 connecting calculation node 23 to its medium 33. Connection 7, ports 2 and 3, respectively referenced 14 and 15 in FIG. 1, of the switch 1, connection 8 together form a link 5 connecting calculation node 22 to its medium 32. Connection 7, ports 8 and 9, respectively referenced 17 and 18 in FIG. 1, of the switch 1, connection 8 together form a link 6 connecting calculation node 21 to its medium 31. The PCIe connections 7, 8 or 9, can be grouped together on a PCIe bus.

The calculation node 23 is connected to the management port by default, i.e. it is via same that transmissions out of the group of calculation nodes 2 and receptions originating from outside the group of calculation nodes 2 pass. In case of failure of this calculation node 23, the latter is replaced by the calculation node 22 which is connected to the redundant management port, which calculation node 22 then becomes connected to the new effective management port.

When a calculation node has a physical fault, for example calculation node 21 or calculation node 22, let us consider here calculation node 21, the last recent local backup of its calculation state is stored on its storage medium 31.

In a system according to the prior art, since the storage medium 31 is only accessible by its calculation node 21 and the latter has totally physically failed, this recent local backup would become inaccessible, and it would then be necessary to resort to more complex and less recent backup levels, hence a significant loss of global efficiency for the computer system.

In the system according to one embodiment of the invention, presented in FIG. 1, the connection of storage medium 31 is reconfigured, i.e. storage medium 31 will cease to be connected to its default-connection calculation node 21 but will become connected to calculation node 23, which, being connected by default to the management port, will be able to recreate the local backup of the calculation state of defective calculation node 21 from storage medium 31 to another spare calculation node outside the group of calculation nodes 21 to 23, this other calculation node then itself resuming the calculation task interrupted at the defective calculation node 21 from the local backup of the calculation state of calculation node 21 remounted from storage medium 31.

In the switch 1, port 9 (numbering of the PLX8733 electronic switch, but another PCIe switch can be used), referenced 18 (in FIG. 1), instead of remaining permanently connected to port 8 referenced 17 as before the failure of calculation node 21, will be, at least temporarily connected to port 0 referenced 11, in order to enable calculation node 23 to read, from storage medium 31, the backed-up data representing the calculation state of calculation node 21 just before or shortly before its failure. Thus, the local backup, in storage medium 31, of the calculation state of calculation node 21 before its failure, will be able to be remounted up to calculation node 23 and thus be utilized to relaunch the calculation with a very good compromise between simplicity of the backup and efficiency of the relaunch.

Alternatively, if calculation node 23 is itself a spare node, it may itself resume the calculation task interrupted by defective calculation node 21.

If it is node 23 which becomes defective, it is firstly replaced by calculation node 22 as connected to the management port, and calculation node 22, as connected to the new management port, carries out the operations previously carried out by calculation node 23 if same had not become defective.

The management of the switch 1 is now described by a manual scenario clarifying and explaining the different operations to be performed, such as for example the migration of storage medium 31 from a defective calculation node 21 to a spare calculation node 23, the transfer of data, the restarting of the application. The management of data on the application side is abstracted by the FTI library.

The application executed is provided in the examples of the FTI library: hdf.exe. This application is launched on two calculation nodes. It will carry out local backups on NVMe storage disks connected to these calculation nodes by the PCIe switch at regular intervals, as well as a global backup on an NFS ("Network File System") server, less frequently. Once the application has been launched, a fault is generated on one of the two calculation nodes. The migration of the NVMe storage disk from the defective node to another node will then enable the transfer of data from the last local backup of this defective node to the spare node. Once this transfer has been carried out, the application can be relaunched and resumes the calculation at the last local backup of the two calculation nodes instead of the older last global backup of the network part.

In this context, a fault recovery is carried out with local backup data from an MPI ("Message Passing Interface") application of a calculation node that has become faulty. The data is recovered by virtue of the migration of the storage medium from the defective calculation node to a neighboring calculation node of the same compute blade. This data is then transmitted to a second spare node which will resume the calculation. The benefit of this fault recovery is that it enables the application to restart from local backups of all the calculation nodes. These less expensive local backups are also usually more recent, and at worst are just as recent, as the global backups. Moreover, the amount of data transferred in order to resume the calculation will be much lower than in the case of restarting from a global backup.

In the following development, the parts of text in a box or between brackets relate to lines of computer code.

The configuration of the FTI library ["config.fti" in the "examples" directory], in order to authorize the execution on two different calculation nodes:

```
[basic]
head                    = 0
node_size               = 1
ckpt_dir                = /localckpt/
glbl_dir                = /globalckpt/
meta_dir                = /home/user/.fti
ckpt_11                 = 1
ckpt_12                 = 2
ckpt_13                 = 3
ckpt_14                 = 4
inline_12               = 1
inline_13               = 1
inline_14               = 1
keep_last_ckpt              = 0
group_size              = 2
verbosity               = 1
[restart]
failure                 = 1
exec_id                 = 2016-10-27_15-25-56
[injection]
rank                    = 0
number                  = 0
position                = 0
frequency               = 0[advanced]
block_size                  = 1024
mpi_tag                 = 2612
local test              = 1
```

On each of the two calculation nodes, referred to here as N1 (referenced 21 in FIG. 1) and N2 (referenced 22 in FIG. 1), the local backup directory ["/localckpt/"] is a mount of the SSD ("Solid State Disk") storage disk available on each calculation node, the storage disk S0 (referenced 31 in F 1) on calculation node N1 and the storage disk S1 (referenced 32 in FIG. 1) on calculation node N2:

```
$ mpirun -host N1,N2 --mca pmi ob1 --mca btl self,vader,tcp --mca coll
^hcoll,fca --mca oob_tcp_if_include enp12s0f0 --mca btl_tcp_if_include
enp12s0f0 -n 2 hdf.exe
[FTI Information]: Reading FTI configuration file (config.fti)...
[FTI Information]: The execution ID is: 2016-11-09_17-09-10
FTI_Topo->nodeSize: 1, FTI_Topo->nbProc: 2
FTI_Topo->nbNodes: 2 FTI_Topo->nbNodes: 2 FTI_Topo->groupSize: 2,
FTI_Topo->nodeSize 1
FTI_Topo->nodeSize: 1, FTI_Topo->nbProc: 2
FTI_Topo->nbNodes: 2 FTI_Topo->nbNodes: 2 FTI_Topo->groupSize: 2,
FTI_Topo->nodeSize 1
[FTI Information]: FTI has been initialized.
Local data size is 2048 × 1027 = 32. MB (32).
Target precision: 0.00500
[FTI Information]: Variable ID 0 to protect. Current ckpt. size per rank is
0.00 MB.
[FTI Information]: Variable ID 2 to protect. Current ckpt. size per rank is
16.05 MB.
[FTI Information]: Variable ID 1 to protect. Current ckpt. size per rank is
32.09 MB.
Step: 100, error= 0.25488
[FTI Information]: Post-checkpoint took 0.00 sec. (Ag:0.00s, Pt:0.00s,
Cl:0.00s)
[FTI Information]: Ckpt. ID 1 (L1) (32.09 MB/proc) taken in 0.13 sec.
(Wt:0.00s, Wr:0.12s, Ps:0.00s)
Step: 200, error= 0.12412
[FTI Error - 000000]: Cannot rename local directory: No such file or
directory
[FTI Error - 000001]: Cannot rename local directory: No such file or
directory
[FTI Information ]: Post-checkpoint took 0.12 sec. (Ag:0.00s, Pt:0.00s,
Cl:0.12s)
[FTI Information]: Ckpt. ID 2 (L4) (32.09 MB/proc) taken in 0.48 sec.
(Wt:0.00s, Wr:0.36s, Ps:0.12s)
Step: 300, error = 0.08203
Step: 400, error = 0.06127
```

[FTI Information]: Post-checkpoint took 0.00 sec. (Ag:0.00s, Pt:0.00s, Cl:0.00s)
[FTI Information]: Ckpt. ID 3 (L1) (32.09 MB/proc) taken in 0.13 sec. (Wt:0.00s, Wr:0.12s, Ps:0.00s)

A fault of calculation node N1 is brought about, thereby causing an interruption of the calculation of this calculation node N1:

[$ ipmitool-H bmc-N1-Uuser-Ppass power off]

In the previous trace, the first-level L1 local backups are differentiated from the fourth-level L4 global backups. The calculation was interrupted after having carried out a fourth-level L4 global backup and a first-level L1 local backup that is more recent than the fourth-level L4 global backup, which statistically speaking in practice will correspond to the vast majority, if not to say virtually all, of the occurrences of faults.

Since calculation node N1 is considered faulty, the storage disk S0 which was connected thereto will be migrated to another calculation node, here calculation node N3 (referenced 23 in FIG. 1). Calculation node N3 is the node which has the administration port of the switch.

The first step is to send the command which makes it possible to re-route the PCI reset, the final argument being the number of the faulty or defective node:

[$ ipmitool-Hpm-bmc-N3-Usuper-Ppass raw 0x3a 0xcd 1]

This command can be executed from the neighboring nodes or from the management node.

The state of the ports of the switch (referenced 1 in FIG. 1) is verified:

```
$ bpsm_info
Active management port found @ 01:00:00
Management port control:
    Active mngt port: 0 (enabled)
    Redundant mngt port: 2 (enabled)
Virtual switch enable: 00000007
VS0:
    Upstream port: 0
    Downstream ports: 1 10
VS1:
    Upstream port: 2
    Downstream ports: 3 11
VS2:
    Upstream port: 8
    Downstream ports: 9 12
```

The port 9 (referenced 18 in FIG. 1) of the switch, on which is located the storage disk S0 of the faulty or defective node N1 at the current calculation node N3:

```
$ bpsm_grab_port 9
Sucessfully grabbed downstream port 9
$ bpsm_info
Active management port found @ 01:00:00
Management port control:
    Active mngt port: 0 (enabled)
    Redundant mngt port: 2 (enabled)
Virtual switch enable: 00000007
VS0:
    Upstream port: 0
    Downstream ports: 1 9 10
VS1:
    Upstream port: 2
    Downstream ports: 3 11
VS2:
    Upstream port: 8
    Downstream ports: 12
```

The system is requested to again scan the PCIe bus:

```
$ echo 1 > /sys/bus/pci/devices/0000:00:00.0/rescan
```

The storage disk S0 is now seen:

```
$ sblk
NAME    MAJ:MIN RM SIZE    RO TYPE MOUNTPOINT
loop0   7:0     0  1.1 G   1  loop
loop1   7:1     0  5 G     1  loop
└live-rw   253:0  0  5 G   0  dm  /
└live-base 253:1  0  5 G   1  dm
loop2   7:2     0  512 M   0  loop
└live-rw   253:0  0  5 G   0  dm  /
nvme0n1 259:0   0  894.3 G 0  disk
nvme1n1 259:1   0  894.3 G 0  disk
```

Once the storage disk S0 has migrated, the data backed up therein can be accessed by mounting the file system:

[$ mount/dev/nvme1n1/localckpt_restore/]

The backed-up data recovered is then transmitted to the spare calculation node in charge of replacing the faulty calculation node N1. This may be the same node as node N3 in charge of recovering data backed up on the storage disk S0.

Since the backed up then recovered data have been transmitted to the calculation node designated spare node, all that remains is to relaunch the application by replacing the faulty calculation node N1 with this last spare calculation node in the command "mpirun":

```
$ mpirun -host N2,N3 --mca pml ob1 --mca btl self,vader,tcp --mca coll
^hcoll,fca --mca oob_tcp_if_include enp12s0f0 --mca btl_tcp_if_include
enp12s0f0 -n 2 hdf.exe
[FTI Information]: Reading FTI configuration file (config.fti)...
[FTI Information]: This is a restart. The execution ID is: 2016-11-09_17-
```

-continued

```
09-10
FTI_Topo->nodeSize: 1, FTI_Topo->nbProc: 2
FTI_Topo->nbNodes: 2 FTI_Topo->nbNodes: 2 FTI_Topo->groupSize: 2,
FTI_Topo->nodeSize 1
FTI_Topo->nodeSize: 1, FTI_Topo->nbProc: 2
FTI_Topo->nbNodes: 2 FTI_Topo->nbNodes: 2 FTI_Topo->groupSize: 2,
FTI_Topo->nodeSize 1
[FTI Information]: Recovering successfully from level 1.
[FTI Information]: FTI has been initialized.
Local data size is 2048 × 1027 = 32. MB (32).
Target precision: 0.00500
[FTI Information]: Variable ID 0 to protect. Current ckpt. size per rank is
0.00 MB.
[FTI Information]: Variable ID 2 to protect. Current ckpt. size per rank is
16.05 MB.
[FTI Information]: Variable ID 1 to protect. Current ckpt. size per rank is
32.09 MB.
Step: 500, error = 0.04888
```

It may be observed that the calculation (which determines here the value of an error equal to 0.04888) has therefore indeed resumed from local first-level L1 backups.

Naturally, this invention is not limited to the examples and embodiments described and shown, but rather is subject to numerous variations accessible to the person skilled in the art.

The invention claimed is:

1. A method of fault management in a network of nodes, comprising, for each node considered of the network of nodes performing a calculation:
   creating a local backup of a state of said node considered at a storage medium associated with said node considered, a link between said storage medium and said node considered being able to be redirected from said storage medium to another node;
   relaunching the node considered if the node considered is not defective, on the basis of the local backup of the state of said node considered, and
   relaunching an operational node different from the node considered, if the node considered is defective, on the basis of a recovery of the local backup of the state of said node considered, by redirecting said link between the node considered and said storage medium so as to connect said storage medium to said operational node, said link redirecting causing an intermediate backup, wherein said intermediate backup is not carried out during the performance of said calculation in a preventative manner for all nodes performing said calculation, but only in the event of a fault and only for any node that is defective after the fault occurs, wherein no other duplication of state of node on a partner node is carried out during the performance of said calculation in a preventative manner for any calculation node, wherein no other duplication of state of node on a partner node is carried out for any calculation node that is non-defective after the fault occurs in the event of a fault.

2. The method of fault management according to claim 1, characterized in that:
   for each non-defective node considered:
      there is no step of recovery by another node of the local backup of the state of said non-defective node considered.

3. The method of fault management according to claim 1, characterized in that the operational node is a spare node.

4. The method of fault management according to claim 3, characterized in that, for all or part of the nodes of the network performing said calculation, the network comprises between 1 and 5 spare nodes per 100 nodes performing said calculation.

5. The method of fault management according to claim 1, characterized in that said redirection of said link between the node considered and said storage medium so as to connect said storage medium to said operational node is carried out by a change of routing in a switch connecting several nodes to storage media associated with said several nodes.

6. The method of fault management according to claim 1, characterized in that the relaunching is synchronized, so as to relaunch all said nodes performing said calculation in said state.

7. The method of fault management according to claim 1, wherein the recovery comprises a sub-step of migration to the operational node or to the spare node, of the storage medium for the local backup of the state of the defective node, which connects said storage medium for the local backup of the state of the defective node to a predetermined location in the file tree of said operational node or of said spare node, said operational node or said spare node then reading, at said predetermined location, the local backup of the state of the defective node, during the relaunching of said operational node or of said spare node,
   no copy of the local backup of the state of the defective node being carried out at another node.

8. The method of fault management according to claim 7, characterized in that the spare node and the defective node both belong to the same compute blade.

9. The method of fault management according to claim 7, characterized in that the migration sub-step changes the connection of the storage medium for the local backup of the state of the defective node by passing via a switch to which the defective node and its storage medium for the local backup of the state of the defective node were connected, but without passing through the defective node itself.

10. The method of fault management according to claim 9, characterized in that the change in connection is carried out by sending a command to the switch, said command passing through one of the nodes connected to the switch by a management port.

11. The method of fault management according to claim 9, characterized in that said switch is a PCIe switch.

12. The method of fault management according to claim 9, characterized in that 3 to 10 nodes are connected to said switch.

13. The method of fault management according to claim 1, characterized in that the step of recovery comprises:
firstly a sub-step of migration to an intermediate node, of the storage medium for the local backup of the state of the defective node, which connects said storage medium for the local backup of the state of the defective node to a predetermined location in the file tree of said intermediate node,
next, a sub-step of copying the local backup of the state of the defective node from the storage medium connected to the intermediate node to the storage medium of the operational node or of the spare node, said operational node or said spare node then reading its storage medium during its relaunching step.

14. The method of fault management in a network of nodes according to claim 13, characterized in that, for all or part of the nodes of the network performing said calculation, the spare node and the defective node belong to different compute blades.

15. The method of fault management according to claim 1, characterized in that all steps are carried out for all nodes of the network of nodes performing said calculation, wherein the local backups are mutually consistent so as to correspond to a same state of said calculation.

16. The method of fault management according to claim 1, characterized in that it also comprises, creating global backups of all or part of nodes of the network, carried out less frequently than said creating of said local backup of said nodes performing said calculation.

17. The method of fault management according to claim 1, characterized in that, for all or part of the nodes performing said calculation, said method of fault management does not comprise any other type of local backup of the state of said nodes.

18. The method of fault management according to claim 1, characterized in that, for all or part of the nodes of the network performing said calculation, the storage media are flash memories, and preferably in that said flash memories are NVMe memories.

19. A part of a network of nodes, comprising:
a switch;
a plurality of nodes of a group of nodes performing a calculation in said network of nodes;
a plurality of storage media respectively connected to said plurality of nodes via the switch, each of the plurality of storage media being structured and arranged to locally backup a state of the plurality of nodes to which they are respectively connected,
the switch being structured and arranged to change at least one connection between a defective node of said plurality of nodes and a storage medium associated with said defective node, which will then become connected to another node of said plurality of nodes,
the change to the at least one connection causing an intermediate backup,
wherein an intermediate backup is not carried out during the performance of said calculation in a preventative manner for all nodes performing said calculation but only in the event of a fault and only for any node of the group of nodes performing said calculation that is defective after the fault occurs,
wherein no other duplication of state of node a partner node is carried out during the performance of said calculation in a preventative manner for any node of the group of nodes performing said calculation,
wherein no other duplication of state of node on a partner node is carried out for any node of the group of nodes performing said calculation that is non-defective after the fault occurs in the event of a fault.

20. The part of a network of nodes according to claim 19, characterized in that the switch being structured and arranged to change at least one connection between a defective node and a storage medium associated with said defective node, upon a command external to the switch.

* * * * *